Figure 1:
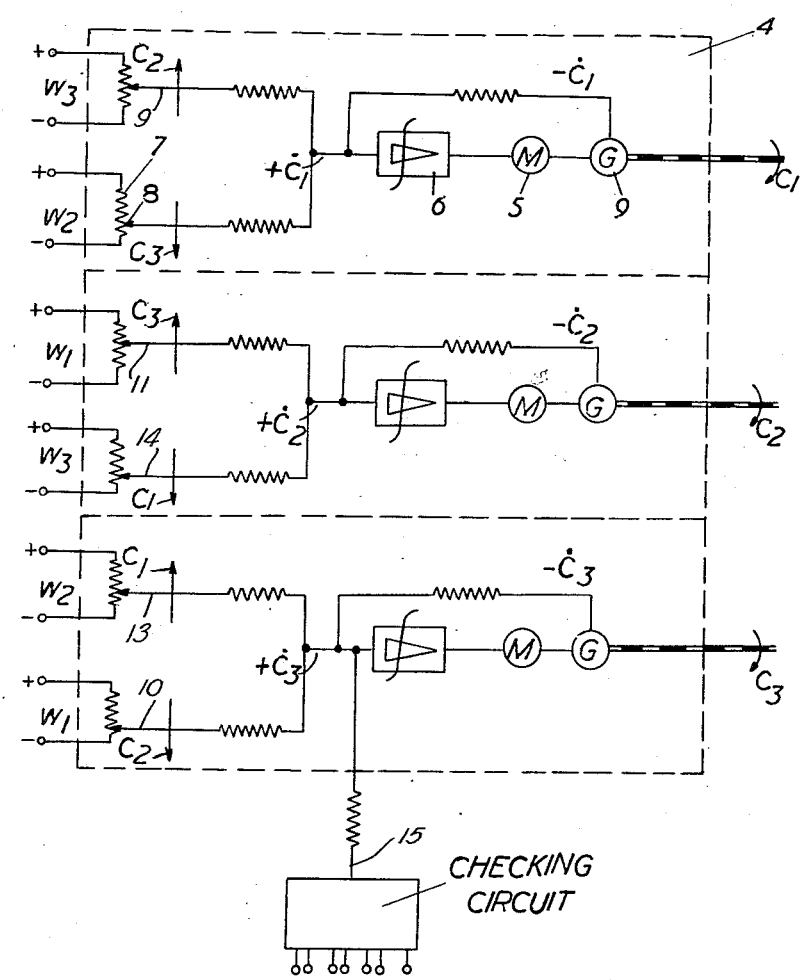

United States Patent Office 3,049,298
Patented Aug. 14, 1962

3,049,298
ANALOG COMPUTER FOR ANGULAR RELATIONSHIPS OF THREE AXIS REFERENCE SYSTEMS
Ernest Edward Barber, South Harrow, and Kenneth Henry Simpkin, Aylesbury, England, assignors to General Precision Systems Limited, a corporation of Great Britain
Filed Dec. 7, 1954, Ser. No. 473,684
Claims priority, application Great Britain Mar. 3, 1954
4 Claims. (Cl. 235—187)

This invention relates to analogue computers for continuously representing the attitude of one spatial reference system with respect to another.

According to the invention, the members of such a computer which define the relationship between the two systems are conditioned, not in accordance with the angles between axes of the systems, but in accordance with the cosines of those angles.

It is particularly concerned with analogue computers for use in aviation training equipment in which the attitude of an aircraft (or a supposed aircraft) has to be represented either with respect to the vertical to earth or to the three axes of an orthogonal system of which one may be the vertical to earth.

According to the invention, the angular relationship defining the attitude of one spatial reference system with respect to another is continuously represented by members which are conditioned not in accordance with the angles themselves but in accordance with the cosines of the angles.

Where it is a question of defining the attitude of an aircraft with respect to the vertical to earth, the computer can have three members which are conditioned respectively in accordance with the cosines of the angles made by the three orthogonal axes of the aircraft with the said vertical. In aviation training equipment, one frequently requires to know, in addition to the orientation of the aircraft to the vertical to earth, the attiude in azimuh or "heading" of the aircraft. This is required, for example, for the simulated operation of compass equipment and certain types of radio navigation systems and for recording the flight path over a map. In such cases, the computer can usefully have a fourth member which is conditioned in accordance with the heading of the aircraft. The rate of change of heading angle may, in the conventional manner, be computed and integrated with respect to time by a servo which accordingly logs heading angle itself. This method is, however, unsatisfactory if the supposed aircraft is to be capable of manoeuvres such as loops or vertical climbs in which its nose-to-tail line moves through the vertical to earth. Whenever this happens, the aircraft's heading changes instantaneously through 180°, and since the servo is not capable of achieving the infinitely high rate of integration which this implies, errors will arise in integrated heading after such manoeuvres. In cases where it is important to avoid this, the computer can be adapted to define the attitude of the aircraft completely, that is to say, to represent the angular relationship between its three axes and the three axes of the reference system. The computer would have nine members conditioned respectively in accordance with the cosines of the nine angles which come into question. The heading of the aircraft will then remain correctly defined throughout all manoeuvres, the definition being in a trigonometrical form from which the heading angle itself may be continuously derived by compounding means such as are commonly used in the analogue computing art for obtaining angles from their trigonometrical functions.

The condition of the attitude defining members can be influenced either electrically or mechanically. For example, the outputs of the members may be voltages varying both in magnitude and sign; or they can be speeds or displacements.

Figure 2:
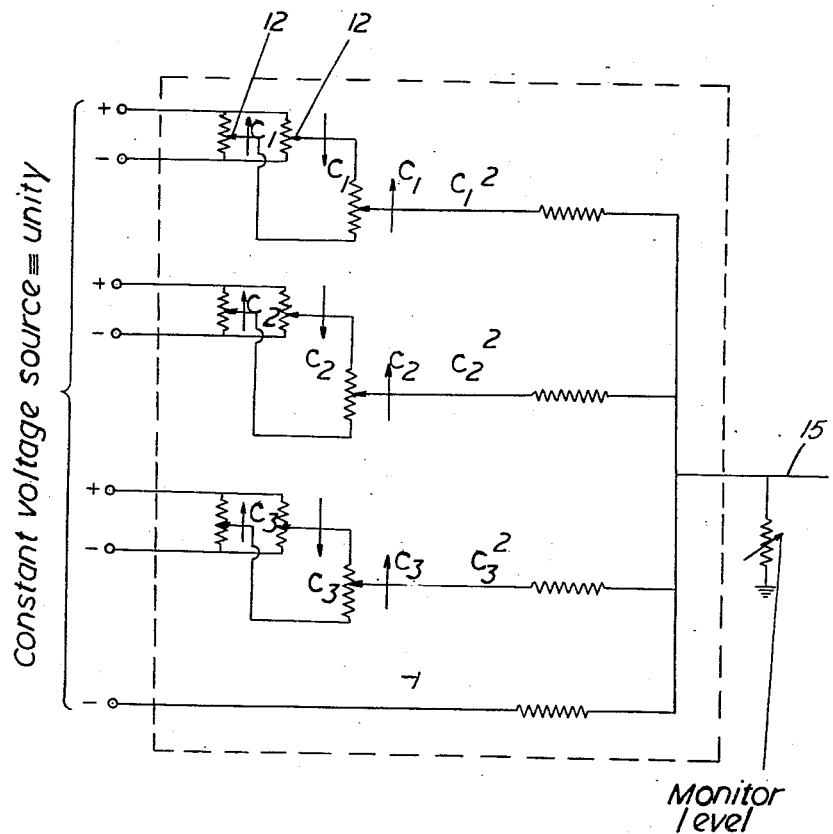

In order that the invention may be thoroughly understood, an example in accordance with it as applied to the flight computer system of a ground aviation trainer will now be described with reference to the accompanying drawing in which:

FIGURE 1 shows diagrammatically an arrangement of three servo units as used when it is assumed that the plane cannot point vertically or near vertically, and its attitude is expressed by means of three angles and the azimuthal heading, and FIGURE 2 shows diagrammatically a checking circuit.

In this computer, the orientation of the supposed aircraft with respect to earth is treated as the angular relationship between an orthogonal set of aircraft structure axes, namely:

(1) A nose-to-tail or "rolling" axis;
(2) A transverse "pitching" axis at right angles to (1); and
(3) The perpendicular to (1) and (2), and a vertical axis $c$ perpendicular to the earth (assumed to be flat).

The principal feature of the attitude-defining part of the computer is a group of three electro-mechanical servo units 4 (FIG. 1) in the form of electric motors 5 controlled by electronic amplifiers 6 to adjust respectively three groups of potentiometers to computed settings. The operational summing amplifiers 6 may be of a type well known in the computer art, as for example that disclosed by Swartzel in United States Patent No. 2,401,779, which issued June 11, 1946. The setting for each servo unit is the computed instantaneous value of the cosine of the angle between the axis $c$, and one of the axes 1, 2, 3. For convenience hereinafter, such a cosine value will be signified by $c_1$, $c_2$ and $c_3$ as the case may be.

If $\omega_1$, $\omega_2$, and $\omega_3$ are respectively the instantaneous angular rolling, pitching and yawing rates of the aircraft about its own structure axes, 1, 2, 3, it can be shown that the value of the cosine $c_1$ at any instant is given by $$c_1 = \int_0^t (\omega_3 c_2 - \omega_2 c_3) \, dt$$

and that the other two cosines are given by similar integral equations with the integrand in brackets using rates and already computed cosines in cyclic progression, as it were.

Thus, referring to FIGURE 1 assuming voltages representing $\omega_1$, $\omega_2$, and $\omega_3$ to have been obtained elsewhere in the computer, these may be so used as the supply voltages to the various potentiometers 7 in the groups driven by the three servos in accordance with the cosine values $c_1$, $c_2$, $c_3$ as to obtain at the potentiometer sliders 8 voltages representing all the "cosine times angular rate" terms in the integrands. For example, in the case of the $c_1$ servo control voltages $\omega_2$ and $\omega_3$ are used as the supply voltages to two potentiometers 7 the sliders of which are driven by servos in accordance with the cosine values $c_3$ and $c_2$ respectively. The sliders of the several input potentiometers in FIG. 1 are each mechanically coupled to one of the output motor shafts $c_1$, $c_2$ or $c_3$ whereby the sliders are driven by their respective shafts in the directions indicated by the several arrows in FIG. 1. Thus, output shaft $c_2$ drives potentiometer sliders 9 and 10, shaft $c_3$ drives sliders 8 and 11, and shaft $c_1$ drives sliders 13 and 14, as shown by the arrows in FIG. 1. In similar fashion the several potentiometers of the voltage deriving networks in the error correcting circuit of FIG. 2 are also coupled to and driven by the correspond shafts $c_1$, $c_2$ and $c_3$ in the directions indicated by the arrows of FIG. 2. The manner in which the circuit of FIG. 2 operates to correct cumulative errors will be described hereinafter.

In the case of the $c_1$ servo control, the $\omega_3 c_2$ and $\omega_2 c_3$ voltages so obtained, and the voltage output of a feedback generator 9 driven by the $c_1$ servo motor, are all three algebraically summed in the input circuit of a summing amplifier 6 controlling the servo motor 5 itself, so that the latter runs at a speed proportional to the sum of the two input control voltage $\omega_3 c_2$ and $\omega_2 c_3$ and consequently positions its potentiometer group in accordance with the time integral of this quantity, i.e. in accordance with the cosine $c_1$ as defined by the equation quoted above. This technique for obtaining the time integral of a computed voltage is well known in the art relating to analogue computers, as disclosed, for example, by Mynall, "Electrical Analogue Computing," in Electronic Engineering, July 1947. An alternative is to use the well known electronically-integrating type of amplifier (with condenser feedback) driving the motor as a conventional positional servo.

In a system according to the invention, it is possible for imperfection in the equipment used to result in integrators not operating at exactly the called-for rates. Over a period of time, such inaccuracies will have a cumulative result giving the effect of loss of orthogonality of the axes 1, 2, 3 and of errors in the relationship with axis $c$. It can be shown that the system will not be in error if the following equation is satisfied:

$$c_1^2 + c_2^2 + c_3^2 = 1$$

It will be evident that this quantity can be computed as a voltage by the appropriate use of potentiometers in the cosine-logging servo units themselves. According to a preferable feature of the invention this is done, and any deviation from unity of the voltage so obtained is added to any one of the integrands in the input side of the system in the correcting sense.

FIGURE 2 shows a checking circuit for this purpose. The input to the circuit is supplied by a constant voltage source approximating to unity. The sliders 12 of the potentiometer groups are operated according to the outputs $c_1$, $c_2$ and $c_3$ to provide the products $c_1^2$, $c_2^2$ and $c_3^2$. The elements of the equation:

$$c_1^2 + c_2^2 + c_3^2 - 1 = 0$$

are algebraically summed and any voltage deviation from the correct one is applied via connecting line 15 as an auxiliary integrand to the input side of any one of the summing amplifiers 6 (FIG. 1) of the three servo units. It will be evident that any correction applied to one servo unit will also automatically correct the other two, as the output of each servo unit controls the inputs of all the other servo units by mechanical coupling between the output shaft of each servomotor unit and the input potentiometer sliders of the other servo units.

It is usual in flight computers to evaluate the aircraft attitude to the vertical by computing the rates of change of bank and pitch angles and then integrating these with respect to time. This technique involves the use of servos logging these angles themselves, so that one has to be made of sine/cosine resolving devices to obtain, for example, the various components of the aircraft's weight along its own axes of motion in computing the forces acting on it, and conversely, the components of its airspeed resolved into the vertical-to-earth axis system for computing its rate of climb and hence altitude. In a computer utilising the present invention, however, these resolving functions are performed by simple linear potentiometers, since these can be set by servos directly in accordance with the trigonometrical functions of the attitude angles instead of at the angles themselves.

Where the aircraft is capable of manoeuvres such as loops or vertical climbs orientation is defined by the angular relationship between the aircraft axes 1, 2, 3 and an orthogonal set of axes having directions fixed with respect to the earth, namely:

(a) A horizontal direction.

(b) A second horizontal direction at right angles to (a), and (c) The vertical to the earth.

The attitude defining part of the computer consists of three groups of three electro mechanical servo units as described with reference to FIGURE 1, the output being in accordance with the cosines of the nine angles between the axes of the two systems.

If the cosine values of the angles between the axes, $a$, $b$, $c$ and 1, 2, 3 are designated by $a_1$, $b_3$, $c_2$ and so on as the case may be, it can be shown that the system is not in error if the following six equations are simultaneously satisfied:

$$a_1^2 + b_1^2 + c_1^2 = 1$$
$$a_2^2 + b_2^2 + c_2^2 = 1$$
$$a_3^2 + b_3^2 + c_3^2 = 1$$
$$a_1 a_2 + b_1 b_2 + c_1 c_2 = 0$$
$$a_2 a_3 + b_2 b_3 + c_2 c_3 = 0$$
$$a_3 a_1 + b_3 b_1 + c_3 c_1 = 0$$

Each of these six quantities can be computed as a voltage by the appropriate use of potentiometers in the cosine logging servo units themselves and any difference between the voltages so obtained and their theoretically correct values of unity or zero (as the case may be) applied to the input side of the system in the correcting sense.

Although in the foregoing description the axes 1, 2, 3, of the aircraft orthogonal system are taken to be the axes of the structure of the aircraft itself, it must be understood that in some computations it is more convenient to refer to other orthogonal systems. Such a system could have orthogonal axes as follows:

(1) An axis along the line of flight (termed the wind axis).

(2) An axis perpendicular to (1) in the plane of the wings.

(3) An axis perpendicular to (1) and (2).

It will be understood that the invention is not limited to the particular application described herein. Other examples are the computers required in warfare training devices, where the significant angular relationship is that between an aircraft or guided missile and a moving target, for example another aircraft.

We claim:

1. Analog computer apparatus for representing the angular relationship of a first orthogonal spatial reference system having three axes with respect to an axis of a second orthogonal reference system, comprising in combination, means for deriving first, second and third electrical quantities each commensurate with the angular velocity of an individual axis of said first reference system with respect to said axis of said second reference system, three servomechanisms each arranged to provide a respective mechanical output shaft position commensurate with the time integral of its respective resultant applied electrical quantity, six potentiometers, each of said servomechanisms being connected to position an individual respective pair of said six potentiometers; said first, second and third electrical quantities each being applied to excite individual pairs of said potentiometers thereby to provide six voltages; and circuit means combining individual pairs of said six voltages to provide said resultant applied electrical quantities.

2. Apparatus according to claim 1 in which at least one of said servomechanisms comprises an integrating servomechanism having an amplifier, motive means and means for providing a rate voltage commensurate with the rate of change of said output position of said servomechanism, said rate voltage and a resultant applied electrical quantity being applied to said amplifier, whereby said motive means varies said output position at a rate commensurate with said resultant applied electrical quantity.

3. Apparatus according to claim 1 in which at least one of said servomechanisms comprises a position servomechanism connected to be operated by the output potential of an electronic integrating amplifier, thereby to position said servomechanism in accordance with the time integral of a resultant applied electrical quantity applied to said electronic integrating amplifier.

4. Apparatus according to claim 1 including error checking circuitry which comprises three potential deriving means, each of said potential deriving means being operated by the shaft position of a different one of said servomechanisms and each operative to provide a further potential commensurate with the square of the shaft position of its associated servomechanism, means for deriving a constant potential, circuit means combining the further potentials and said constant potential to provide an error potential, and further circuit means connecting said error potential to the input of one of said servomechanisms.

References Cited in the file of this patent

UNITED STATES PATENTS

| | | |
|---|---|---|
| 2,476,747 | Lovell | July 19, 1949 |
| 2,742,227 | Bubb | Apr. 17, 1956 |
| 2,953,303 | Sedgfield | Sept. 20, 1960 |

OTHER REFERENCES

Hall: Ruthrauff and Dill, "Applications of Computers to Aircraft Dynamic Problems," Proceedings of Western Computer Conference, Los Angeles, Feb. 4–6, 1953, published by IRE, June 1953, pages 128–139.